April 19, 1966 I. HOROWITZ 3,247,429

SEMI-CONDUCTOR NEGATIVE-RESISTANCE STRUCTURE

Filed Oct. 21, 1963

INVENTOR
IRVING HOROWITZ

BY Rines and Rines

ATTORNEYS 3,247,429
SEMI-CONDUCTOR NEGATIVE-RESISTANCE STRUCTURE

Irving Horowitz, Eatontown, N.J., assignor to Blonder-Tongue Electronics, Newark, N.J., a corporation of New Jersey Filed Oct. 21, 1963, Ser. No. 317,529
5 Claims. (Cl. 317—256)

The present invention relates to semi-conductor negative-resistance circuits and, more particularly, to combined trimmer-capacitance and tunnel diode assemblies and the like.

In numerous circuits, semi-conductor devices are employed for a host of purposes including, for example, detection or mixing functions in the case of diode devices, such as tunnel diodes and the like. Converters in the ultra-high-frequency band, as an illustration, may embody tunnel diodes and the like for the dual purpose of serving as a negative-resistance element in the local oscillator circuit and as the mixer for beating the received ultra-high-frequency signals with the local oscillations. While manufacturing techniques enable a substantially constant value of negative resistance to be attained in tunnel diodes, the barrier capacitance thereof varies within a relatively wide range, say of the order of 2 to 8 $\mu\mu$f. in the case of General Electric Type TD–1 diodes. This requires, for uniform tuning and tracking performance in mass-produced ultra-high-frequency television converters, for example, the associating of a variable trimmer capacitance with the diode circuit to produce a substantially constant net capacitance irrespective of the particular tunnel diode inserted into the circuit. Practical capacitance structures, however, introduce inherent inductance that supplements the spreading resistance of the tunnel diode and can produce a net positive impedance that is greater than the magnitude of the negative resistance of the tunnel diode or the like (of the order of —110 ohms in the case of the TD–1 unit before-mentioned), causing spurious oscillation that detrimentally affects the local-oscillation and intended beating function of the tunnel diode circuit.

The present invention is accordingly primarily directed to the problem of providing a novel trimmer capacitance structure for association with tunnel diodes and the like that, in summary, by a novel tubular construction, maintains the inductance of the capacitance-diode structure sufficiently low to prevent the possibility of such spurious oscillation.

A further object of the invention is to provide a new and improved semi-conductor-trimmer capacitance structure of more general utility, also.

Other and further objects will be explained hereinafter and will be more particularly delineated in the appended claims.

Figure 1:
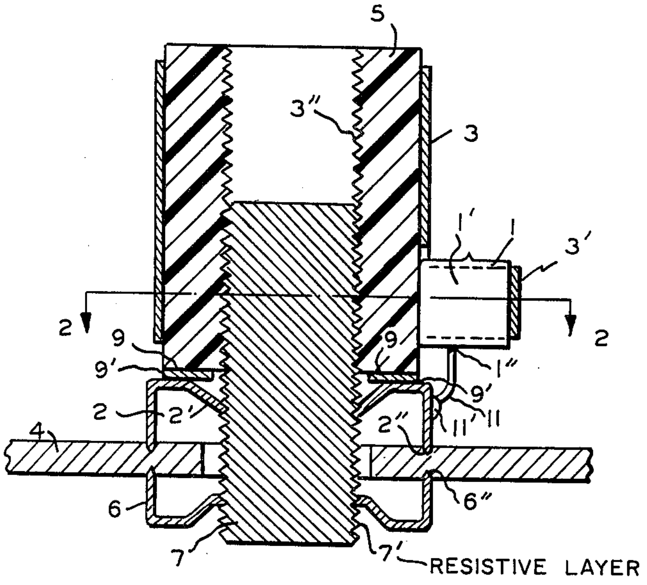
Figure 2:
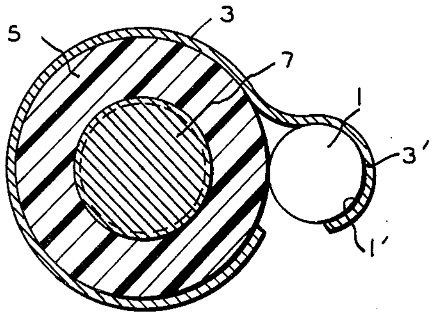

The invention will now be described in connection with the accompanying drawings, FIG. 1 of which is a longitudinal sectional view, greatly magnified, of a preferred embodiment; and FIG. 2 is a transverse section taken along the line 2—2 of FIG. 1, looking in the direction of the arrows.

The tunnel diode or similar negative-resistance semiconductor device and the like is shown at 1 received within a conductive resilient clamp arm 3′ extending at the lower end of a conductive sleeve 3 secured to the outer peripheral surface of an insulating ceramic or similar tube 5. The sleeve 3 serves as a peripheral or outer electrode of a trimmer capacitance comprising the outer electrode 3, the insulating tube 5 and an inner screw electrode 7 variably threadable within a threaded axial recess 3″ through the tube 5 to increase or decrease the capacitance provided thereby.

In accordance with the invention, the trimmer capacitance 3–5–7 is connected between the outer housing terminal surface 1′ of the tunnel diode 1 and the other terminal 1″ thereof by minimal inductance connections, later described, that, no matter what the tuning position of the screw electrode 7 within the tube 5 for ultra-high-frequency conversion, insure a net positive reactance always less than the negative resistance of the tunnel diode 1, thus inherently suppressing spurious oscillations, as previously explained.

The clamp 3′ bears resiliently against the tunnel diode housing terminal surface 1′, providing minimal inductance connection to the outer electrode surface 3; though it has been found that the electrode surface 3 must be terminated a short distance from the lower end of the tube 5, as shown, to avoid coupling effects with the screw electrode structure. At the lower end of the tube 5, a silver or other conductive layer or surface 9 is provided that is soldered at 9′ to the upper surface of an apertured cup-shaped spring nut 2. The nut aperture is bounded by depressed resilient surfaces 2′ that engage the screw electrode 7 threaded therethrough, the cup-opening facing downward away from the tube 5 to engage the upper surface of the chassis 4 upon which the apparatus is mounted. The nut 2 thus electrically connects the screw electrode 7 to a point just outside the lower end of the tube 5, keeping the inductance extremely negligible irrespective of the tuning position of the screw electrode 7. A very short lead 11 is soldered to the cap 2 at 11′ to connect the terminal 1″ of the device 1 by a short constant minimal inductance connection. While the before-mentioned solder connection 9′ keeps the assembly 3–5 from rotating relative to the nut 2, a further nut 6, similar to the nut 2 but threaded on the screw electrode 7 in inverted fashion, is forced against the underside of the chassis 4 to clamp the assembly 3–5–2 to the chassis 4. The nuts 2 and 6 may have teeth 2″ and 6″ for digging into the chassis 4.

If desired, a resistive oxide layer 7′ may be formed upon the screw electrode 7, such as an oxide-coated steel screw, to add series resistance, further to suppress spurious parasitic oscillation.

Further modifications will also occur to those skilled in the art and all such are considered to fall within the spirit and scope of the invention as defined in the appended claims.

What is claimed is:

1. The combination of a two-terminal semi-conductor negative-resistance device provided with a trimmer capacitor comprising an insulating tube having an electrode surface disposed along a peripheral region of the tube terminating a short distance from one end of the tube, the said one end being provided with a conductive surface, a cup-shaped spring nut having an aperture bounded by resilient surfaces and disposed with the cup-opening facing away from the tube and with the resilient surfaces secured to the conductive surface at the said one end of the tube, means for securing one terminal of the device to the said peripheral electrode surface, a short lead extending between the other terminal of the device and the nut across the said short distance, and a screw electrode extending within the tube and engaged by the said resilient surfaces just beyond the said one end of the tube.

2. A combination as claimed in claim 1 and in which the device is disposed on one side of an apertured chassis surface against which the free edge of the cup-opening bears, with the screw electrode passing therethrough, and a further nut received by the screw electrode and bearing against the opposite side of the chassis.

3. A combination as claimed in claim 1 and in which a resistive layer is provided upon the surface of the screw electrode.

4. A combination as claimed in claim 1 and in which the said electrode surface comprises a conductive clamp provided with a resilient arm for clamping the said one terminal of the device thereto.

5. A combination as claimed in claim 4 and in which the said device is a tunnel diode the outer housing of which serves as the said one terminal and is received and clamped to the tube by the said arm.

References Cited by the Examiner

UNITED STATES PATENTS

| | | | |
|---|---|---|---|
| 2,595,194 | 4/1952 | Heibel | 317—249 |
| 2,824,480 | 2/1958 | Hotchkin | 317—249 X |
| 3,034,027 | 5/1962 | Swick | 317—249 |
| 3,173,029 | 3/1965 | Nadolsky | 323—93 X |

JOHN F. BURNS, *Primary Examiner.*